June 10, 1958 R. M. ASHBY ET AL 2,838,614

MAGNETIC RECORDING HEAD

Filed May 12, 1952

INVENTORS
ROBERT M. ASHBY
AVARD F. FAIRBANKS
WILLOUGHBY M. CADY

BY William R. Lane
ATTORNEY 2,838,614
Patented June 10, 1958

2,838,614

MAGNETIC RECORDING HEAD

Robert M. Ashby, Pasadena, Avard F. Fairbanks, Garvey, and Willoughby M. Cady, Pasadena, Calif., assignors to North American Aviation, Inc.

Application May 12, 1952, Serial No. 287,438
7 Claims. (Cl. 179—100.2)

This invention relates to magnetic recording, and particularly to an improved magnetic recording head.

A magnetic recording head converts an electric signal into a fluctuating magnetic field. The useful portion of this magnetic field is formed across an air gap through which a tape or disc coated with a magnetic oxide is moved at a constant speed. This magnetic field causes the magnetic oxide coating to become magnetized along its length with a strength and polarity proportional to the strength and polarity of the air gap magnetic field. Since the air gap field's strength and polarity is in turn proportional to the electric signal input, the variations in field strength along the coating are proportional to the variations in the input signal.

The speed at which the tape or disc must pass through the air gap, in order to obtain satisfactory reproduction of the input signal, is dependent on two factors. The first factor is the sensitivity of the coating. This is a measure of the number of signals a coating is capable of recording per inch of tape. Very sensitive coatings have been developed in the past and it is not an object of this invention to improve the coating used. The other factor is the degree of concentration of the air gap field.

If the air gap field's longitudinal dimension, that is, the dimension of this field in the direction of tape movement, is made smaller, the distance the tape must move between signals to prevent overlapping of individual signals is correspondingly smaller. Therefore, when the field's longitudinal dimension is reduced, the speed at which the coating must pass through the air gap is reduced. The ability of a recording head to produce a field with a small longitudinal dimension is a measure of the resolution of the head.

In the past, efforts to improve the resolution of recording heads by reducing the field's longitudinal dimension have been directed toward reducing the width of the pole face of the recording head at the air gap. It is well known in the art that the magnetic lines of force spread out when crossing the air gap. A major portion of this dispersion of the field is caused by leakage flux which leaves the sides of the pole face instead of the end. As the pole face width is reduced this leakage flux becomes a dominant factor causing undesired dispersion of the field and limiting the amount of reduction of the field's longitudinal dimension which can be obtained by this method. Therefore, the degree of concentration of the air gap field which can be obtained by reducing the dimensions of the pole face is limited. In order to store more information on a disc of a given size a greater degree of concentration of the field, than is possible using prior methods, is necessary.

It is therefore an object of this invention to provide a magnetic recording head which eliminates the leakage flux from the sides of the pole face.

It is another object of this invention to provide a magnetic recording head with optimum resolution in recording signals.

It is a further object of this invention to provide a magnetic recording head which produces a very narrow magnetic field useful in recording on a coated tape or disc.

It is another object of this invention to utilize the magnetic field produced by two parallel conductors carrying current in opposite directions to obtain a concentrated magnetic field useful for magnetic recording.

It is a further object of this invention to shape parallel conductors carrying current in opposite directions to thereby limit the dispersion of the magnetic field produced between them.

Other objects of the invention will become apparent from the following description taken in connection with the accompanying drawings, in which Fig. 1 is an elevation view of the preferred form of the invention;

Figure 4:
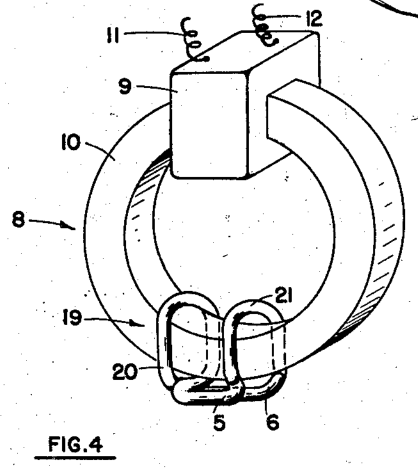
Fig. 4 is a view of an alternate form of the invention.
Figure 5:
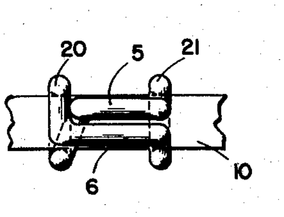

And Fig. 5 is a bottom view of the device shown in Fig. 4.

Figure 3:
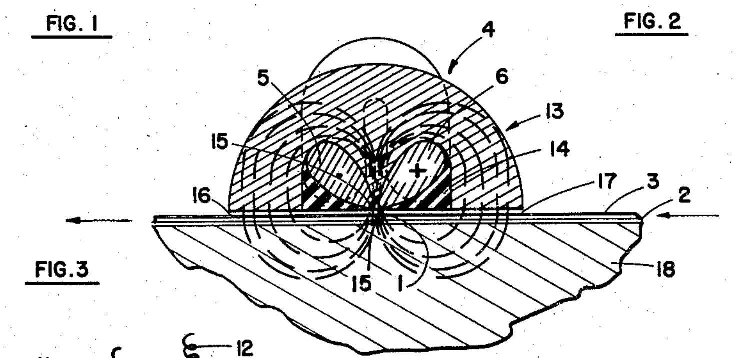
Fig. 3 is a sectional view of the device shown in Fig. 1 taken along the line 3—3.

Referring to Fig. 3 a minimum dispersion of the magnetic field across air gap 1 in the direction of movement of tape 2 is desired. Tape 2 has a coating 3 of a magnetic oxide. Tape 2 is positioned to move to the left, as shown in Fig. 3. The resolution of recording head 4 is determined by the smallness of the longitudinal dimension of the field in air gap 1. This longitudinal dimension is measured in the direction of movement of the tape.

Figure 1:
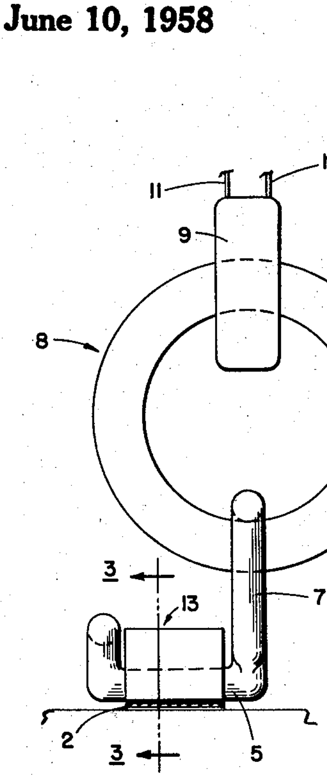
Figure 2:
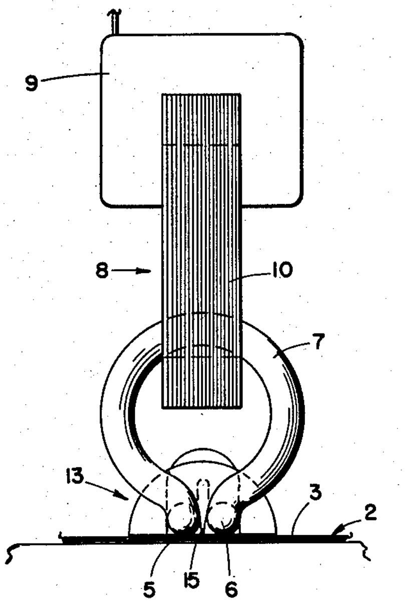
Fig. 2 is a side view of the device shown in Fig. 1.

Referring now to Fig. 1, conductors 5 and 6 are positioned parallel to each other and normal to the direction of movement of tape 2. The conductors are connected in series across single loop secondary coil 7 of transformer 8. The connections are made in a manner to cause the instantaneous current in conductor 5 to flow in the opposite direction from the instantaneous current in conductor 6. This is accomplished by connecting one end of conductor 5 to a terminal of secondary coil 7 and connecting the adjacent end of conductor 6 to the other terminal of coil 7. The opposite adjacent ends of conductors 5 and 6 are connected together. In addition to coil 7, transformer 8 consists of primary coil 9 and laminated iron core 10. Primary coil 9 is connected to a source (not shown) of electric signal by means of leads 11 and 12.

Referring to Fig. 3, parallel conductors 5 and 6 are held very close together and in close proximity to air gap 1 by means of support 13 and cement 14. Support 13 is preferably made of ferromagnetic material while cement 14 has poor permeability. Support 13 has a pointed section 15 positioned between conductors 5 and 6. Support 13 has a much larger cross section area on the other sides of conductors 5 and 6. Return path air gaps 16 and 17, therefore, have a much larger cross-section area than air gap 1. Backing 18 for tape 2 is also preferably made of ferromagnetic material with a large cross-section area compared with that of point 15.

In operation, magnetic lines of force are formed around each conductor when carrying current. Referring to Fig. 3, at a given instant, the current in conductor 5 is assumed as flowing toward the observer at which instant the current in conductor 6 flows away from the observer. As is well known in the art, the magnetic lines of force formed by the current in conductor 5 have a direction counter-clockwise around conductor 5. The magnetic lines of force formed by the current in conductor 6 have a direction clockwise around conductor 6. It is impossible for any of the lines of force around conductor 5 to also enclose conductor 6. Therefore, all of the magnetic lines of force formed by conductors 5 and 6 must pass between the conductors. By placing the conductors very close together the field is forced into a very narrow beam. The leakage flux which caused the dispersion of the field in prior recording heads is eliminated by using the conductors to determine the boundaries of the flux.

By shaping the conductors as indicated in Fig. 3, the dispersion of the field in the direction of the movement of the coated material is further minimized. Magnetic lines of force do not tend to bend in sharp corners and hence the flux passing between adjacent portions of conductors 5 and 6 will tend to continue across air gap 1 and into backing 18. By confining the lines of force into a narrow beam as near to the air gap as possible, the amount of spreading is minimized. This confinement of the lines is accomplished by the egg-shaped cross-section of the conductors. The small tapered ends are placed close to each other immediately adjacent to the air gap. Other configurations which place current carrying portions of the conductor close to each other immediately adjacent to the air gap can be used.

Since the cross-section area of point 15 is small compared to the area of the return paths at air gaps 16 and 17, the flux density at air gap 1 will be much higher than the flux density at air gaps 16 and 17. Therefore, the effect of flux fluctuations in gaps 16 and 17 can be disregarded and only the fluctuations at air gap 1 will affect the alignment of the magnetic oxide coating and be reproduced.

If support 13 and backing 18 are made of ferromagnetic material the strength of the field is increased but the fidelity is reduced. A large mass of ferromagnetic material tends to resist changes in flux more than nonmagnetic material does. Therefore, for good fidelity a support of nonmagnetic material is preferred. The longitudinal direction of the useful field in air gap 1 is still very small when nonmagnetic material is used since the boundaries of the flux are determined by the relative positions of conductors 5 and 6.

In order to obtain a maximum amount of power transfer, the impedance of the load on the secondary of a transformer should be equal to the internal impedance of the secondary. Therefore, conductors 5 and 6 are preferably designed to have a total impedance equal to the impedance of secondary loop 7.

Figs. 4 and 5 show an alternative arrangement for obtaining the desired opposite flow of current in conductors 5 and 6. In this arrangement, secondary 19 of transformer 8 consists of two loops 20 and 21. Loop 20 is connected to one set of adjacent ends of conductors 5 and 6, while loop 21 is connected to the opposite adjacent ends of conductors 5 and 6 in a manner to aid each other in causing the current to flow in the conductors in opposite directions.

Maximum reduction of field dispersion of a recording head is obtained by this invention by parallel conductors connected to carry current in opposite directions and positioned as near to each other and as near to the air gap as possible. The parallel conductors, when placed adjacent to the air gap form the boundaries for the flux and force the lines of force into a very narrow beam just as it leaves the recording head and enters the air gap. Leakage flux from the sides of a pole face is therefore eliminated and the flux leaves the head with an optimum degree of concentration.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A magnetic recording head comprising two closely-spaced parallel sections of wire, said sections of wire being egg-shaped with the tapered ends in close proximity to each other so as to confine the lines of magnetic flux into a narrow beam, means subject to an electric signal for causing an equal amount of current to flow through said sections of wire in opposite directions, and means for conveying a magnetic recording medium through the magnetic field generated between said parallel sections of wire by said current flow and in a direction substantially normal to said magnetic field.

2. A magnetic recording head for producing on a moving magnetic oxide coating variations of magnetic field strength proportional to an electric signal comprising two closely-spaced parallel conductors positioned in a plane parallel to said moving coating, said parallel conductors being egg-shaped with their tapered ends in close proximity to each other and to said moving coating, so as to confine the lines of magnetic flux into a narrow beam connection means connecting said conductors to the source of said signal in a manner to cause the instantaneous current in said conductors to flow in the opposite directions, and means for conveying said magnetic oxide coating through the magnetic field generated between said parallel sections of wire in said parallel sections of wire (by said instantaneous current) and in a direction substantially normal to said magnetic field whereby the boundaries of said magnetic field are determined by the relative positions of said conductors.

3. A magnetic recording head comprising a wire support having two closely-spaced parallel grooves; a wire segment in each of said grooves; said wire segments being egg-shaped with the tapered ends in close proximity to each other so as to confine lines of magnetic flux generated by a current flow into a narrow beam; means subjecting said wire segments to electric signals of equal frequency and magnitude but opposite polarity to thereby cause the instantaneous current in said wire segments to flow in opposite directions in said grooves; and means for conveying a recording medium through the magnetic field generated between said grooves by said current flowing through said wire segments in a direction substantially normal to said magnetic field.

4. A magnetic recording head comprising a recording medium having a magnetizable surface; a wire support having two closely-spaced parallel grooves; a transformer core; a primary winding on said transformer core, said primary winding being subjected to the electric signal to be recorded; an endless secondary winding on said transformer core, said endless secondary winding including two wire segments connected in series and individually disposed in each of said parallel grooves, said series connection being in a manner to cause the instantaneous current in said segments to flow in opposite directions in said grooves; and means for conveying said recording medium electrically insulated from said wire segments through the magnetic field generated between said grooves by said current flowing in said wire segments and in a direction substantially normal to said magnetic field whereby said recording medium is subjected to a concentrated magnetic field whose boundaries in the direction of movement of said recording medium are determined by the spacing between said wire segments.

5. A magnetic recording device characterized by a minimum dispersion of the magnetic field in the direction of movement of a tape comprising two parallel sections of wire positioned in a plane parallel to the plane of said tape and substantially normal to said direction of movement, each of said wire sections pointed in cross section and positioned with the pointed ends in close proximity with each other and with said tape, support means maintaining said wire sections in close proximity to each other, and means subjected to an electric signal to cause an equal amount of current to flow in said wire sections in opposite directions past said tape whereby said tape is subjected to a very narrow magnetic field normal to the direction of movement of said tape.

6. A device as recited in claim 5 in which said support means is composed of a ferromagnetic material.

7. A device as recited in claim 4 in which said wire segments are egg-shaped with the tapered ends in close proximity to each other and said recording medium, thereby confining the lines of magnetic flux into a narrow beam.

References Cited in the file of this patent

UNITED STATES PATENTS

| | | |
|---|---|---|
| 2,247,847 | Pfleumer | July 1, 1941 |
| 2,483,398 | Bradstad | Oct. 4, 1949 |
| 2,658,114 | Buhrendorf | Nov. 3, 1953 |
| 2,680,156 | Thorensen | June 1, 1954 |

FOREIGN PATENTS

| | | |
|---|---|---|
| 612,450 | Germany | Apr. 25, 1935 |